United States Patent [19]
Ono et al.

[11] Patent Number: 5,930,091
[45] Date of Patent: Jul. 27, 1999

[54] MAGNETIC DISK HAVING CSS AREA WITH CONCAVE AND CONVEX PORTIONS AND APPARATUS CONTAINING THE SAME

[75] Inventors: Masahiko Ono, Ibaraki-ken; Yoshishige Endo, Tsuchiura; Hiroshi Matsumoto, Odawara; Yoshihiro Moriguchi, Hiratsuka; Noriyuki Shige, Odawara; Kazuhiro Fujise, Ibaraki-ken, all of Japan

[73] Assignee: Hitachi, Ltd., Tokyo, Japan

[21] Appl. No.: 08/820,683

[22] Filed: Mar. 18, 1997

[30]  Foreign Application Priority Data

Mar. 19, 1996  [JP]  Japan ................................ 8-062477

[51] Int. Cl.$^6$ ........................................................ G11B 5/72
[52] U.S. Cl. ................................... 360/135; 428/694 TR
[58] Field of Search .................................. 360/103, 133, 360/135; 428/65.3, 694 TR

[56]  References Cited

U.S. PATENT DOCUMENTS

| | | | |
|---|---|---|---|
| 5,504,646 | 4/1996 | Tanaka et al. | 360/135 |
| 5,550,696 | 8/1996 | Nguyen | 360/135 |
| 5,576,918 | 11/1996 | Bar-Gadda et al. | 360/135 |
| 5,604,014 | 2/1997 | Onodera | 428/141 |
| 5,618,448 | 4/1997 | Kuroe et al. | 216/97 |
| 5,626,935 | 5/1997 | Goto et al. | 428/64.1 |
| 5,635,269 | 6/1997 | Weir et al. | 428/65.3 |
| 5,680,285 | 10/1997 | Nakamura et al. | 360/135 |
| 5,718,811 | 2/1998 | Chen et al. | 204/192.2 |
| 5,721,033 | 2/1998 | Teng et al. | 428/65.3 |
| 5,729,399 | 3/1998 | Albrecht et al. | 360/75 |

FOREIGN PATENT DOCUMENTS

| | | |
|---|---|---|
| 2-143920 | 6/1990 | Japan . |
| 3-168919 | 7/1991 | Japan . |
| 5-307748 | 11/1993 | Japan . |
| 9-081932 | 3/1997 | Japan . |

*Primary Examiner*—Jefferson Evans
*Attorney, Agent, or Firm*—Antonelli, Terry, Stout & Kraus, LLP

[57]  ABSTRACT

In order to provide a magnetic disk apparatus and a magnetic disk which is excellent in reliability and durability, and which enables high density recording, respectively, this invention provides a method for forming fine concave and convex portions (uneven area) on the magnetic disk by coating masking material particles only in the CSS area on the magnetic disk, etching the magnetic disk, and removing the masking material particles.

8 Claims, 7 Drawing Sheets

MAGNETIC DISK HAVING CSS AREA WITH CONCAVE AND CONVEX PORTIONS AND APPARATUS CONTAINING THE SAME

BACKGROUND OF THE INVENTION

This invention relates to a magnetic disk apparatus, a magnetic disk used for the magnetic disk apparatus, a particles coating apparatus, and a method of forming concave or convex portions on the magnetic disk.

The magnetic disk apparatus records/regenerates information using its magnetic head, which flies and moves above a turning magnetic disk.

Usually, the magnetic head uses the contact start stop system (hereafter, to be referred to as CSS). The magnetic head comes in contact with (lands on) an area on the object magnetic disk while the disk is stopped and it flies with the turning of the disk for recording/regenerating information.

In this case, if the area on the surface of the magnetic disk to be contacted by the magnetic head (hereafter, to be referred to as a CSS area) is smooth, the magnetic head is absorbed by the magnetic disk when it flies/lands from/on the surface of the disk to apply an impact force to the disk. If some water exists between the magnetic head and the magnetic disk when the disk stops (the head lands), the magnetic head has a tendency to stick fast to the magnetic disk. In the worst case, information recorded on the disk is damaged.

To solve such a problem, for example, a method of forming many bumps having no sharp angles in the CSS area was disclosed in Japanese Patent No. 307748/1993 (hereafter, to be referred to as the prior art).

The prior art describes that many bumps having no sharp angles are formed in the CSS area at pitches of 1 $\mu$m or under, so that the magnetic head is prevented from sticking fast to the magnetic disk, and this improves the durability of the magnetic disk accordingly. However, the prior art only describes that the bumps have no sharp angles and does not indicate the sizes of those bumps.

When a magnetic disk having many bumps was turned in practice, it was found that the ability to prevent the magnetic disk from sticking fast to the magnetic head depended on the size of those bumps. Furthermore, the magnetic head became unstable in floating and was not effective for improving the recording density of information.

Additionally, although the prior art describes how to form bumps for a magnetic disk whose base is made of plastic, it does not describe any method of forming bumps for other magnetic disks, whose bases are made of aluminum and glass. Thus, it has been impossible so far to apply the prior art to those magnetic disks whose bases are made of aluminum and glass.

An object of this invention, therefore, is to provide a magnetic disk apparatus which is excellent in reliability and durability and which enables high density recording, as well as a magnetic disk to be used for such a magnetic disk apparatus.

Another object of this invention is to provide a particles coating apparatus which is excellent in reliability and durability and which may be used for forming concave or convex portions on a magnetic disk which is capable of high density recording, and a method of forming such concave or convex portions on the magnetic disk.

SUMMARY OF THE INVENTION

In order to solve the above prior art problems, various countermeasures were examined by the present inventors who came to the conclusion that the floating height and absorption of the magnetic head to the disk was not caused by the convex surfaces of the magnetic disk CSS area, but was caused by the average surface roughness Ra, the convex portions to be contacted by the magnetic head (hereafter, to be referred to as convex portions/area), and the rate of convex portions to the total area of convex and concave portions (uneven area).

For example, it was found that if the convex area was assumed to be 1/100, then the magnetic head's absorbability became about ½ even when the average surface roughness Ra was the same value.

Figure 20:
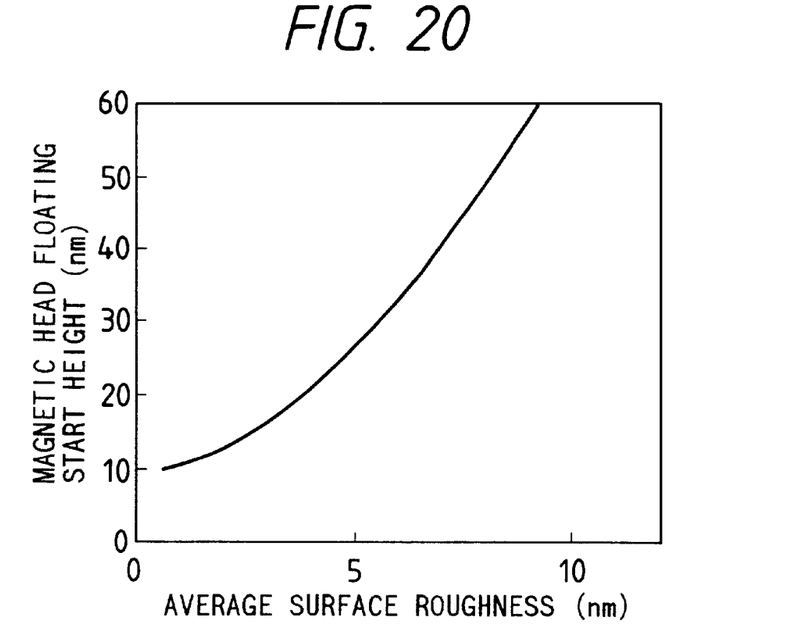
FIG. 20 is a graph which shows a relation between magnetic head floating start height and average surface roughness.
Figure 21:
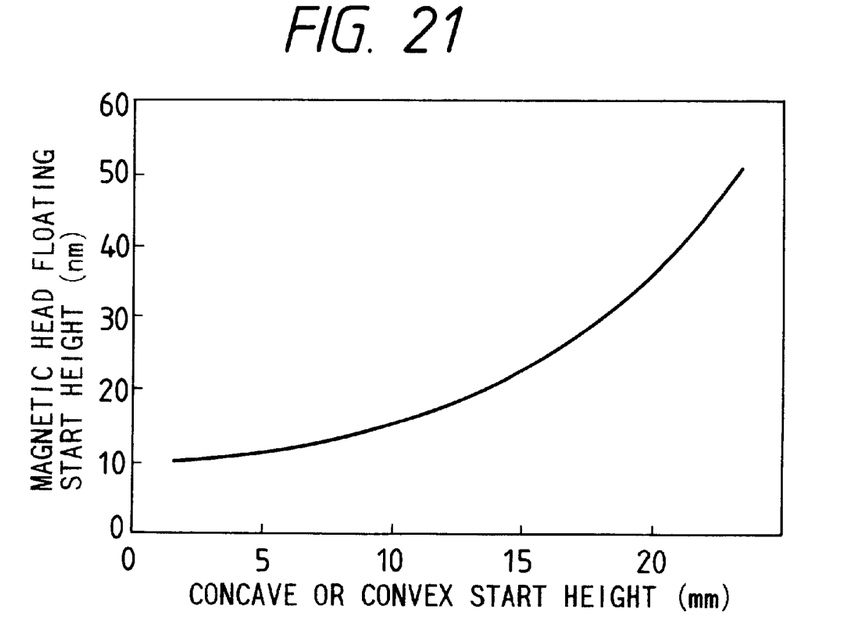
FIG. 21 is a graph which shows a relation between magnetic head floating start height and concave or convex start height.

When the average surface roughness or concave and convex heights are reduced as shown in FIG. 20 and FIG. 21, the floating start height of the magnetic head can be suppressed to a low value, and if the average surface roughness is set to 8 nm or under and the concave and convex heights are set to 20 nm or under, the floating start height of the magnetic head can be reduced to 50 nm or under.

The average surface roughness Ra is defined in JIS B0601 as "average roughness Ra on the center line".

Furthermore, a method for freely controlling the convex portions in this uneven area was found. According to the method, particles having an average diameter of 10 to 1000 nm are monodispersed and coated on a magnetic disk at the desired dispersion density, and then the magnetic disk is etched to remove the particles, so that fine concave and convex portions can be formed on any part of the disk.

To achieve the above object, the magnetic disk apparatus of this invention is provided with one of the following configurations.

(1) The magnetic disk apparatus comprises a magnetic disk and a magnetic head, and this magnetic head records/reproduces data on/from the magnetic disk while it is floated and moved above the surface of the magnetic disk. The magnetic disk has a data area for recording information and a CSS area to be contacted by the magnetic head and the magnetic head has a floating start height of 50 nm or under in the CSS area.

(2) The magnetic disk apparatus comprises a magnetic disk and a magnetic head, and this magnetic head records/reproduces data on/from the magnetic disk while it floats and is moved above the surface of the magnetic disk. The magnetic disk has a data area for recording information and a CSS area for to be contacted by the magnetic head, and the CSS area has concave and convex portions having an average surface roughness Ra of within 1 to 20 nm, an average diameter Dm of the convex portions being within 10 to 1000 nm.

(3) The magnetic disk apparatus comprises a magnetic disk and a magnetic head, and this magnetic head records/reproduces data on/from the magnetic disk while it floats and is moved above the magnetic disk. The magnetic disk has a data area for recording information and a CSS area to be contacted by the magnetic head. The CSS area has concave and convex portions existing together with smooth portions, and the average surface roughness Ra of the uneven area is within 1 to 20 nm, the average diameter of the convex portions Dm being within 10 to 1000 nm.

(4) In (2) or (3) above, the total area of the convex portions is within 1 to 5% of the total area of the concave and convex portions.

To achieve the above object, the magnetic disk of this invention also has one of the following configurations.

(5) In a magnetic disk having a data area for recording information and a CSS area to be contacted by the magnetic head, convex and concave portions are formed in the CSS area, and the average surface roughness Ra of the convex and concave portions is within 1 to 20 nm, the average diameter Dm of the convex portions being within 10 to 1000 nm.

(6) In a magnetic disk having a data area for recording information and a CSS area to be contacted by the magnetic head, convex, concave, and smooth portions exist together in the CSS area, and the average surface roughness Ra of the convex and concave portions is within 1 to 20 nm, the average diameter Dm of the convex portions being within 10 to 1000 nm.

(7) In (5) or (6) above, the total area of the convex portions is within 1 to 5% of the total area of the convex and concave portions.

Furthermore, to achieve the above object, the particles coating apparatus of this invention has one of the following configurations.

(8) The particles coating apparatus comprises a first container for reserving a water repellent solution; a second container for reserving a solution containing dispersed fine particles; a turning device for turning the magnetic disk with the center of the magnetic disk being supported; and a controller for controlling the position of the disk so that the magnetic disk is dipped in the water repellent solution in the first container up to a desired position from the outermost periphery, and then the disk is dipped in the solution containing dispersed fine particles in the second container up to the desired position from the outermost periphery.

(9) The particles coating apparatus comprises a supporting device for supporting a magnetic disk; nozzles for coating the solution containing dispersed fine particles on the disk when in contact with the magnetic disk; a supplying device for supplying the solution containing dispersed fine particles to the nozzles; and a controller for controlling the nozzles so that the solution dispersed fine particles can be coated on desired positions of the magnetic disk.

(10) The particles coating apparatus comprises a turning device for turning the magnetic disk by supporting the center portion of the magnetic disk; nozzles for coating a solution containing dispersed fine particles on the disk when in contact with the magnetic disk; a supplying device for supplying the solution containing dispersed fine particles to the nozzles; and a controller for controlling the nozzles so that the solution containing dispersed fine particles can be coated on desired positions of the magnetic disk.

(11) In (8) or (10), the diameters of the particles are within 10 to 1000 nm.

(12) In (9) or (10), the diameter of each nozzle is within 0.1 to 5 mm and a cotton cloth whose size is almost the same as that of the nozzle is set at a portion where the nozzle is in contact with the magnetic disk.

Furthermore, to achieve the above object, a method of forming concave or convex portions on the magnetic disk according to the invention employs one of the following procedures.

(13) The method comprises a first process for dipping the magnetic disk within a range between the outermost periphery of the disk and the innermost periphery of the data area in a water repellent solution while turning the magnetic disk; a second process for dipping the magnetic disk within a range between the outermost periphery of the magnetic disk and the innermost periphery of the CSS area in a solution containing dispersed fine particles while turning the magnetic disk; a third process for etching the magnetic disk for a specified time; and a fourth process for removing the particles stuck in the second process.

(14) The method comprises a first process for coating a solution containing dispersed fine particles on the magnetic disk within an area where the concave or convex portions are to be formed by getting the nozzles containing the solution into contact with the area; a second process for etching the magnetic disk for a specified time; and a third process for removing the fine particles stuck in the first process.

(15) The method comprises a first process for coating a solution containing dispersed fine particles on the magnetic disk within an area where the concave or convex portions are to be formed by getting the nozzles containing the solution into contact with the area while turning the magnetic disk; a second process for etching the magnetic disk for a specified time; and a third process for removing the particles stuck in the first process. In each of the above methods, the processes are executed sequentially in ascending order.

With any of the configurations (1) to (4), the magnetic disk of this invention can reduce the possibility of the magnetic head's sticking in the CSS area and control the magnetic head floating height to a low value stably. Thus, this invention can provide a magnetic disk apparatus which is excellent in reliability and durability, and which enables high density recording. Furthermore, the magnetic disk of this invention also has the following features.

(a) Since the average surface roughness Ra of the uneven area is within 1 to 20 nm and the average diameter of the convex portions Dm in the uneven area is within 10 to 1000 nm, the magnetic head can have proper floating characteristics and proper absorption characteristics.

An average surface roughness Ra under 1 nm is not favorable, since the absorbability becomes large even when the average diameter of the convex portions is any value. If Ra is over 20 nm, it becomes difficult to control the magnetic disk floating height to a low value and maintain the floating stability.

If the average diameter of the convex portions is under 10 nm, that is, if the diameter of particles used as an etching mask is under 10 nm, secondary cohesion will occur easily and accordingly it becomes difficult to monodisperse particles in a coating solution. Thus, particles cannot be dispersed on the base of the magnetic disk.

A Dm value over 100 nm is not favorable. Because, the absorbability becomes large even when Ra is small.

(b) Since concave, convex, and smooth portions exist together in the CSS area, the degree of absorbability of the magnetic head in the CSS area becomes acceptable. Furthermore, since areas, each of which has a different reflection factor from other areas are formed in the CSS area, this CSS area can be detected by an optical sensor, etc., so that the CCS area can be used for detecting the rotation speed, positions, etc. of the magnetic disk.

(c) Since the total area of the convex portions is within 1 to 5% of the total area of both concave and convex portions, the magnetic head absorbability becomes under 4 gf, so that a magnetic disk apparatus with a higher reliability can be provided.

The magnetic disk of this invention, concerning examples (5) to (7), can reduce the magnetic head's absorbability in the CSS area and control the magnetic head floating height to a low value stably. Thus, this invention can provide a magnetic disk apparatus which is excellent in reliability and durability, and which enables high density recording. Furthermore, the magnetic disk of this invention also has the following features.

(a) Since the average surface roughness Ra of the uneven area is within 1 to 20 nm and the average diameter of the convex portions Dm in the uneven area is within 10 to 1000 nm, the magnetic head can have proper floating characteristics and proper absorption characteristics.

An average surface roughness Ra under 1 nm is not favorable, since the absorbability becomes large even when the average diameter of the convex portions is any value. If Ra is over 20 nm, it becomes difficult to control the magnetic head floating height to a low value and maintain the floating stability.

If the average diameter of the convex portions is under 10 nm, that is, if the diameter of particles used as an etching mask is under 10 nm, secondary cohesion will occur easily and accordingly it becomes difficult to monodisperse particles in a coating solution. Thus, particles cannot be dispersed on the base of the magnetic disk.

A Dm value over 100 nm is not favorable because, the absorbability becomes large even when Ra is small.

(b) Since concave, convex, and smooth portions exist together in the CSS area, the degree of absorbability of the magnetic head in the CSS area becomes acceptable. Furthermore, since areas, each of which has a different reflection factor from other areas are formed in the CSS area, this CSS area can be detected by an optical sensor, etc., so that the CSS area can be used for detecting the rotation speed, positions, etc. of the magnetic disk.

(c) Since the total area of the convex portions is within 1 to 5%, of the total area of both concave and convex portions, the magnetic head absorbability becomes under 4 gf, so that a magnetic disk apparatus with higher a reliability can be provided.

Furthermore, since the particles coating apparatus of this invention, concerning examples (8) to (12), can coat monodispersed particles in the concave and convex portions of the magnetic disk at a specified density, this invention can provide magnetic disks which are excellent in reliability and durability, and which enable high density recording by forming concave and convex portions on each magnetic disk on which particles are already coated. This particles coating apparatus also has the following features.

(a) A volatile film can be formed in the data area where neither a concave nor a convex portion is needed by dipping the magnetic disk within a range between the outermost periphery and a desired position in a volatile solution in the first container, and furthermore, the magnetic disk can be dipped within a range between the outermost periphery and a desired position in the particles dispersed solution in the second container for coating particles only in areas where no volatile film is formed.

(b) Since particles can be coated directly in the target area to become concave and convex portions by controlling the nozzles so that the particles dispersed solution can be coated in desired positions on the magnetic disk, there is no need to form a volatile film on the magnetic disk.

(c) Particles can be coated on the same circumferential section by turning the magnetic disk if each nozzle is fixed at a desired position.

(d) Since the average diameter of the convex portions Dm in the uneven area formed on the magnetic disk becomes within 10 to 1000 nm if the diameter of the particles is chosen to be within 10 to 1000 nm, the magnetic head can have proper floating characteristics and proper absorbability.

If the average diameter of the particles is under 10 nm, secondary cohesion will occur easily and accordingly it becomes difficult to monodisperse particles in a coating solution. Thus, particles cannot be monodispersed on the base of the magnetic disk. A Dm value over 100 nm is not favorable, because the absorbability becomes large even when Ra is small.

(e) Particles can be monodispersed on the magnetic disk without secondary cohesion, however, if the diameter of each nozzle is chosen to be within 0.1 to 5 mm and a cotton cloth whose diameter is almost the same as that of the nozzle is put in the portion of the nozzle coming into contact with the magnetic disk.

If each nozzle diameter is under 0.1 mm, secondary cohesion occurs easily in the particles. If it is over 5 mm, it becomes difficult to monodisperse the particles.

And furthermore, the method for forming concave and convex portions on the magnetic disk of this invention, concerning examples (13) to (15), can form concave and convex portions on the magnetic disk after particles are monodispersed in the target area where concave and convex portions (uneven area) are to be formed at a desired density. Thus, this invention can provide a proper method for forming concave and convex portions on the magnetic disk, which is excellent in reliability and durability, and which enables high density recording. This method also has the following features.

(a) A volatile film can be formed in the data area where neither a concave nor a convex portion is needed by dipping the magnetic disk within a range between the outermost periphery of the magnetic disk and the innermost periphery of the data area in a volatile solution while turning the magnetic disk. And furthermore, the magnetic disk can be dipped within a range between the outermost periphery of the magnetic disk and the innermost periphery in the CSS area in the particles dispersed solution while turning the magnetic disk for coating articles only in areas where no volatile film is to be formed. Then, desired concave and convex portions can be formed on the magnetic disk by removing particles by etching the magnetic disk for a desired time.

(b) Since particles can be coated directly in concave and convex portions by getting the nozzles containing the solution into contact with the area where concave and convex portions (uneven area) are to be formed, there is no need to form a volatile film on the magnetic disk.

(c) Particles can be coated on the same circumferential section by turning the magnetic disk if each nozzle is fixed at a desired position.

DETAILED DESCRIPTION OF THE EMBODIMENTS

Hereunder, an embodiment of this invention will be described with reference to FIG. 1 through FIG. 11.

Figure 1:
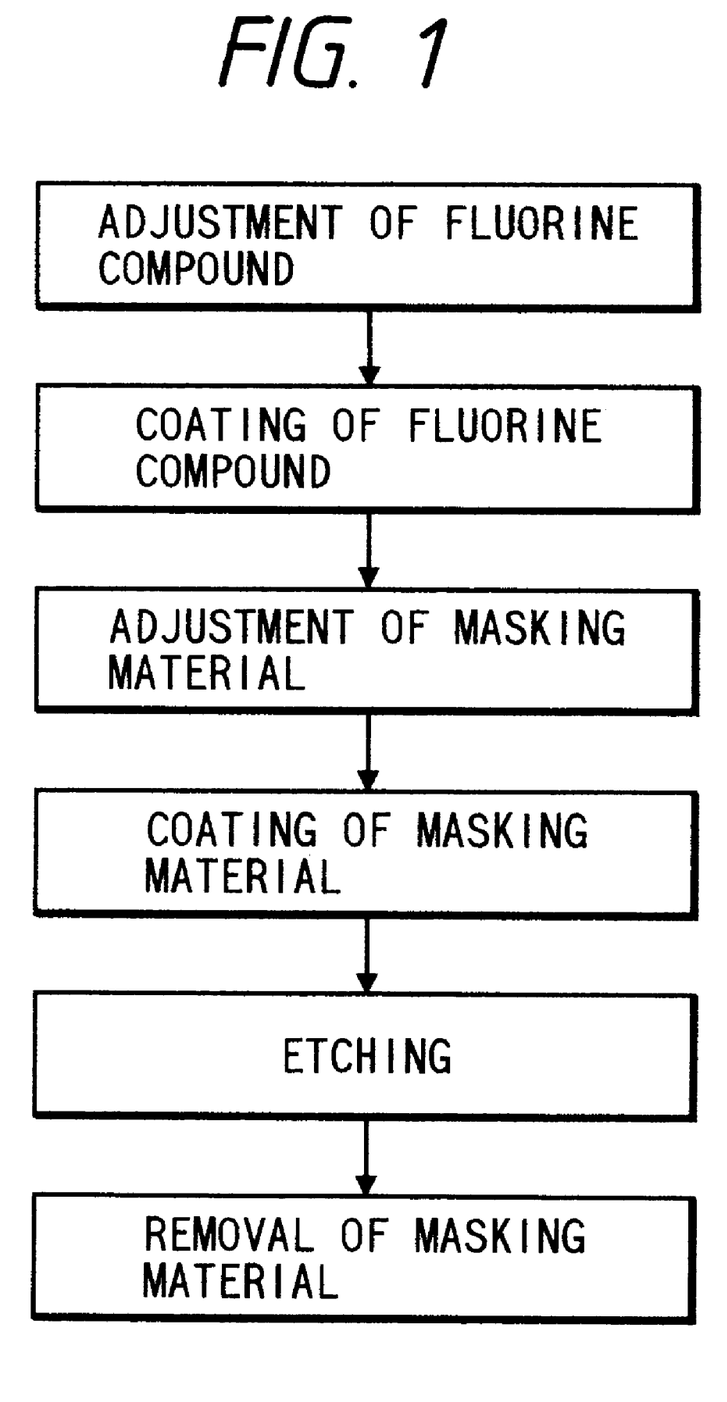
FIG. 1 is a process flow chart concerning an embodiment of this invention.

FIG. 1 shows processes for manufacturing a magnetic disk of this invention. Hereunder, the steps to manufacture the magnetic disk of this invention will be described sequentially with reference to each process.

Figure 2:
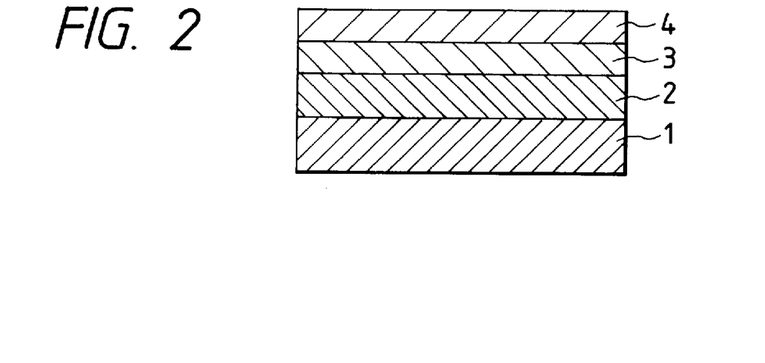
FIG. 2 is a cross section of a magnetic disk concerning an embodiment of this invention.

The magnetic disk of this invention is 3.5 inches in external size. The cross sectional structure of the disk comprises an A1 array base 1, a ground layer 2, a magnetic layer 3, and a protection layer 4 as shown in FIG. 2.

[Adjustment of Volatile Solution]

To secure the water-repellent property of the masking material to be coated in the next process, a liquid-type fluorine compound like perfluoro-ether, fluoroalkyl silane, and the like is mixed with fluorinert FC3255 (3M Corporation) by 1 wt % and stirred sufficiently.

Since a fluorine compound having a water-repellent property against the masking material is mixed with fluorinert FC3255 having a low viscosity in such a way, the fluorine compound can be coated all over the magnetic disk as a thin film.

Instead of the fluorine compound, another material having a water-repellent property may also be used if it is usable as a masking material.

[Coating of Water-repellent Solution]

A water-repellent solution is coated using a coating method like spinning coating, dipping coating, spraying coating, rolling coating, etc.

The spinning coating method allows a water-repellent solution to be coated on desired positions within a short time, but this method allows only one magnetic disk to be coated at a time.

The dipping coating method allows many magnetic disks to be coated at a time, but the treating time is long and the status of the solution must be stabilized during treatment.

The spraying coating method allows coating to be carried out within a short time, but much care must be taken so as not to make particles cohere during treatment.

[Adjustment of Masking Material]

$SiO_2$ particles almost monodispersed in ethanol as a solid matter of 20 wt % to be used as a masking material is thinned by a dispersed solution.

The masking material is not limited to $SiO_2$. Any material having an etching resistance will do. In addition to spherical particles, any material may be used if it can be coated on the magnetic disk while it is monodispersed.

For example, spherical particles may be $Al_2O_3$, $TiO_2$, and the like. There are PTFE, etc. for non-spherical particles. The diameter of particles may be selected according to the size of the target concave or convex portions.

A dispersed solution may be selected from the alcohol group, the ketone group, the ether group, the ester group, the cellosolve group, and the like. It may be a mixture or single. The ratio of particles to a dispersed solution should be adjusted to the target coating amount of particles on the magnetic disk.

[Coating of Masking Material]

A masking material can be coated just like the above flourine compound.

[Etching]

Oxygen etching is carried out on the magnetic disk by controlling the time so that concave and convex portions can be formed at a desired depth in the protection layer 4.

[Removal of Masking Material]

$SiO_2$ particles 15 are washed in pure water so as to be removed from the magnetic disk, and then the disk is dried.

Subsequently, an embodiment of how to manufacture a magnetic disk using the above method will be described.

(1) A liquid-type fluorine compound of a perfluoro-ether family is mixed with fluorinert FC3255 (3M Corporation) by 1 wt % and stirred until it is dispersed completely.

Figure 3:
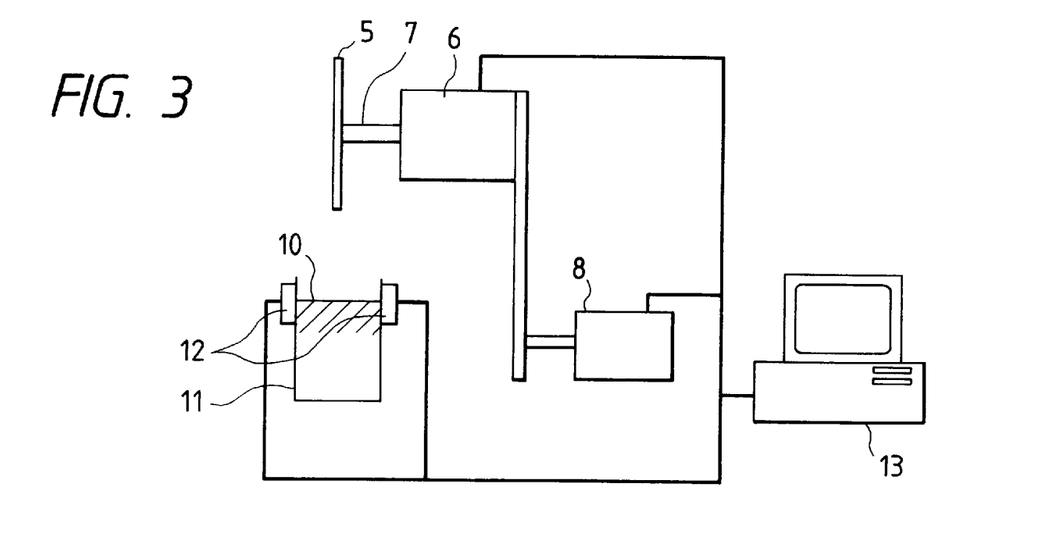
FIG. 3 is a diagram of a particles coating apparatus concerning an embodiment of this invention.

After this, as shown in FIG. 3, a magnetic disk 5 mounted on a rotary shaft 7 of a motor 6 is turned and moved down so as to be dipped partially in a fluorine compound solution 10 by lowering the motor 6 via a belt 9 attached to both the motor 6 and another motor 8. Then, the magnetic disk 5 is removed from the solution 10 and particles are coated on the disk between radiuses 17 mm and 47.5 mm from the center of the disk respectively by operating the motor 6 at high speed (spinning coating).

The level of the fluorine compound solution 10 is detected by an optical sensor 12 provided in the solution bath 11, and the position of the magnetic disk 5 is controlled by a controller 13 so that the coating is made within the desired range of the magnetic disk 5.

Figure 4:
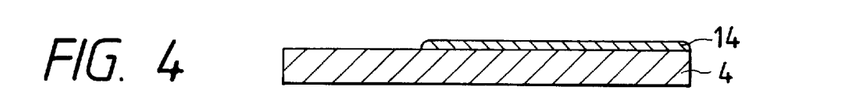
FIG. 4 is a cross section of a magnetic disk coated with a fluorine compound concerning an embodiment of this invention.

FIG. 4 is a cross section of the magnetic disk after being coated with a fluorine compound solution. In FIG. 4, 14 indicates the status of the coated film-like fluorine compound.

Subsequently, $SiO_2$ particles having an average diameter of 300 nm almost monodispersed in ethanol as a solid matter of 20 wt % and to be used as a masking material is thinned by methyl cellosolve, which is a dispersed solution, so that the $SiO_2$ particles become a solid matter of 0.2 wt %.

Methyl cellosolve has a high boiling point and it is so slow to dry that it is possible to effectively spread particles all over the magnetic disk using the spinning coating method.

The masking material is coated on the magnetic disk between radiuses 15 mm and 47.5 mm from the center of the disk respectively using the spinning coating method just like the coating of the above fluorine compound.

Figure 5:
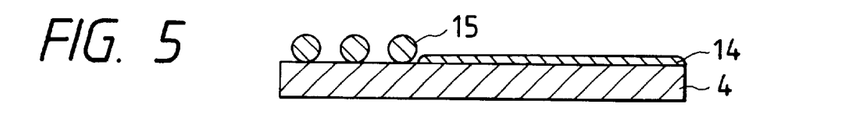
FIG. 5 is a cross section of a magnetic disk coated with $SiO_2$ particles concerning an embodiment of this invention.
Figure 6:
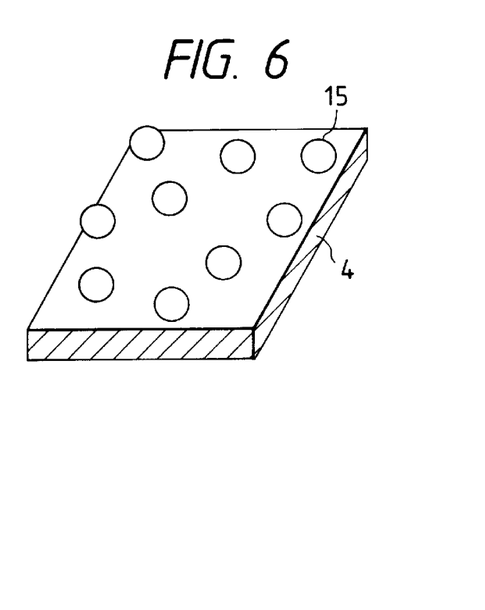
FIG. 6 is a diagram showing $SiO_2$ particles coated on a magnetic disk concerning an embodiment of this invention.

FIG. 5 is a cross section of the magnetic disk after being coated with $SiO_2$ particles. In FIG. 5, 15 indicates $SiO_2$ particles. The $SiO_2$ particles 15 were found to have been almost monodispersed on the magnetic disk 5, as shown in FIG. 6, when checked with an SEM (Hitachi S-4000). The proportion of the area occupied by $SiO_2$ particles was about 1.0 to 1.2%. No $SiO_2$ particles were coated in the area 14 covered by a thin fluorine compound film.

Figure 7:
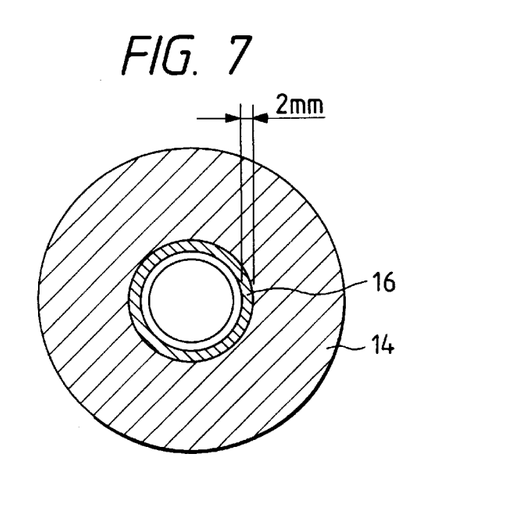
FIG. 7 is a cross section of a magnetic disk coated with a fluorine compound and $SiO_2$ particles concerning an embodiment of this invention.

The $SiO_2$ particle coated area 16 on the magnetic disk was about 2 mm in width between radiuses 15 mm and 17 mm from the center of the disk, respectively, as shown in FIG. 7.

Figure 8:
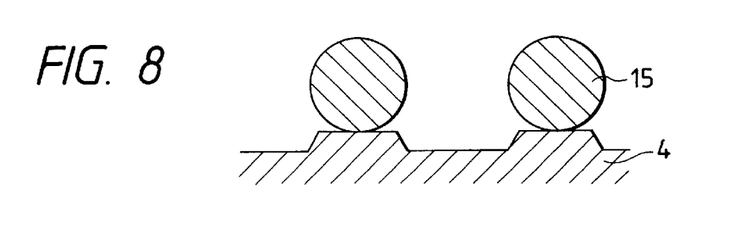
FIG. 8 is a cross section of an etched CSS area concerning an embodiment of this invention.

After this, oxygen etching is carried out on the magnetic disk 5 by controlling the time so that concave or convex portions can be formed on the protection layer at a desired depth. Thus, only the $SiO_2$ particle 15 coated portions are left as convex portions on the protection layer 4 as shown in FIG. 8, and other non-coated portions are etched so as to be left as concave portions.

According to this embodiment, convex portions whose diameters are smaller than the outer diameter of the particles can be adjusted to a desired height (depth) by controlling the etching time.

Figure 9:
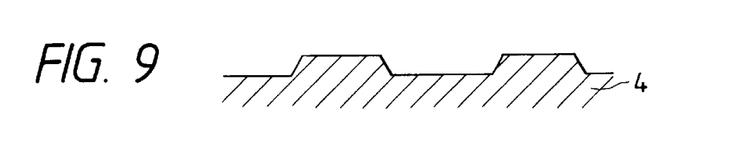
FIG. 9 is a cross section of the CSS area concerning an embodiment of this invention after $SiO_2$ particles are removed from there.

Finally, $SiO_2$ particles 15 are washed off in pure water and the disk surface is dried. Thus, fine concave or convex portions smaller than the diameter of the masking material ($SiO_2$ particles) are formed only in areas on the magnetic disk 5 where $SiO_2$ particles are coated, as shown in FIG. 9.

Figure 10:
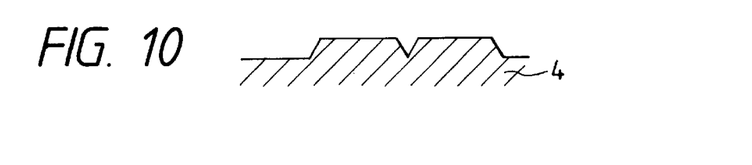
FIG. 10 is a cross section of cohered $SiO_2$ particles concerning an embodiment of this invention on a magnetic disk after etching and removal of $SiO_2$ particles.

The diameter of each convex portion formed under the above conditions and methods is about 210 nm and its height is about 15 nm. Even when two or three $SiO_2$ particles are stuck on the magnetic disk, the concave or convex portion can be formed almost independently of the other, as shown in FIG. 10.

Figure 11:
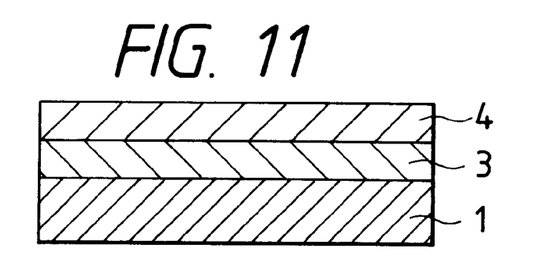
FIG. 11 is a cross section of a glass-made magnetic disk concerning an embodiment of this invention.

(2) The Al array base used in (1) is replaced with a 2.5-inch glass base 8, as shown in FIG. 11, so that a magnetic disk 11 is formed with the glass substrate 8, a magnetic layer 9, and a protection layer 10. Other conditions are the same as those of the manufacturing embodiment 1. At first, a fluorine compound dispersed in fluorinert by 1 wt % are coated on the magnetic disk 11 between a radius of 14 mm from the center and the outermost periphery of the disk using the spinning coating method. Then, $SiO_2$ particles dispersed in methyl cellosolve by 1 wt % is coated on the magnetic disk between a radius of 12 mm from the center and the outermost periphery of the disk. The average diameter of the $SiO_2$ particles is 300 nm. After this, the $SiO_2$ particles are removed by etching. Thus, almost the same concave and convex portions as those in (1) are formed.

If the protection layer on the magnetic disk 11 is the same as that of the above magnetic disk, therefore, desired concave and convex portions can be formed regardless of the magnetic disk size and the base material quality.

(3) The dispersion solvent (ethanol) for the $SiO_2$ particles in (1) is replaced with propylene glycol monomethyl ether. Propylene glycol monomethyl ether is also used as the thinning solvent. And, the solid matter concentration is adjusted to 0.3 wt %. The magnetic disk, the coating methods, the fluorine compounds, and etching and washing methods are the same as those in (1).

Consequently, the $SiO_2$ adhering rate and the rate of the formed concave or convex portions (uneven area) become greater than in (1).

Coating of particles is possible even when the dispersion solvent is changed in such a way. The coating efficiency of particles can also be improved by improving the solid matter concentration.

(4) The diameter of $SiO_2$ particles dispersed in ethanol in (1) is changed from 300 nm to 120 nm. As a thinning solvent for $SiO_2$ particles, propylene glycol monomethyl ether is used to adjust the solid matter concentration to 0.15 wt %. The magnetic disk, the fluorine compound coating method, the $SiO_2$ particle coating method, and the etching and washing methods are the same as those in (1).

The average diameter of the convex portions formed on the magnetic disk above is about 70 nm. Even when the diameter of $SiO_2$ particles are 120 nm, the layer functioned as a favorable mask.

(5) The diameter of the $SiO_2$ particles in (4) is changed from 120 nm to 80 nm. Other conditions are the same as those in (4). The average diameter of the convex portions formed above is about 50 nm. The concave and convex portions are formed properly.

Subsequently, another embodiment of this invention will be described with reference to FIG. 12 through FIG. 16.

In this embodiment, the magnetic disk 5 is manufactured by coating particles in the CSS area of the disk as a masking material without coating any fluorine compound on the disk, then by etching the disk to remove the masking material.

Hereunder, how to manufacture the magnetic disk in this embodiment will be described.

(6) The base of the magnetic disk comprises a ground layer, a magnetic layer, and a protection layer that are formed on a 3.5-inch Al alloy array base sequentially in this order.

0.2 wt % Propylene glycol is dispersed in monomethyl ether to generate $SiO_2$ particles as a masking material having an average diameter of 300 nm.

Figure 12:
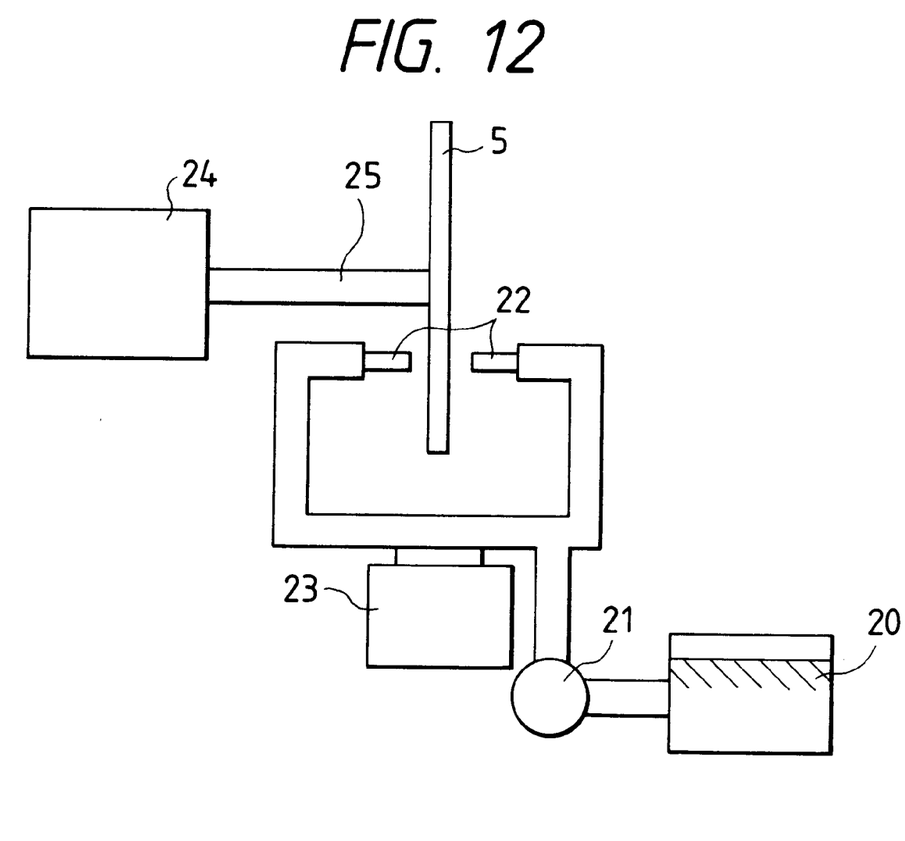
FIG. 12 is a diagram of a particles coating apparatus concerning an embodiment of this invention.
Figure 13:
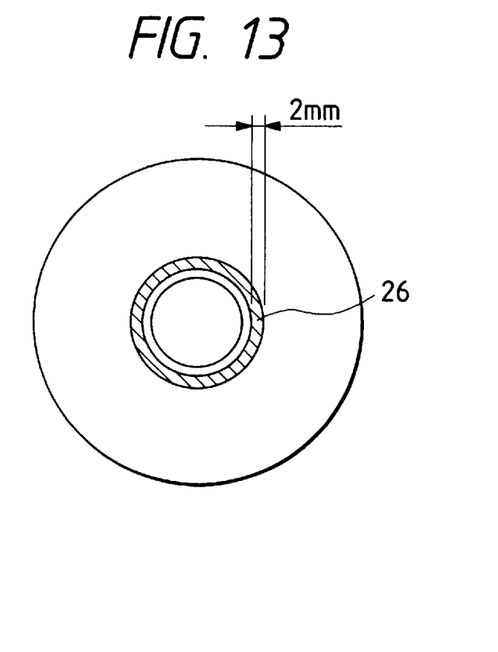
FIG. 13 is an external view of an $SiO_2$ particles coated on a magnetic disk concerning an embodiment of this invention.

The $SiO_2$ particles are coated on the magnetic disk 5 as shown in FIG. 12; at first a $SiO_2$ particle dispersed solution 20 is supplied by a pump 21 to nozzles 22 installed at both sides of the magnetic disk 5. A piece of felt is attached to the tip of each nozzle 22. The inner and outer diameters of the nozzle tip are about 0.5 mm and about 2 mm, respectively. Each nozzle is moved by the motor 23 so that its tip center can be put in contact with a portion 3 mm to the outer periphery from the innermost periphery on each side of the disk, then the spindle 25 of the motor 24 supporting the magnetic disk 5 is turned once to coat the masking material only on the contact portion. At this time, it is only necessary to change the nozzle tip diameter and the nozzle position to coat masking particles within a desired portion. After the magnetic disk 5 is turned once, the nozzles 12 are released from the magnetic disk 5. Thus, masking particles are coated in the area 26 as shown in FIG. 13. The etching and masking material removing processes to be carried out subsequently are the same as those in (1) to (5).

As a result, uniform fine convex and concave portions can be formed at a width of about 2 mm between radiuses 2 mm and 4 mm from the innermost periphery in the particle coated area shown in FIG. 13 respectively on the surface carbon protection film of the magnetic disk. This method can reduce the number of (1) to (5) processes.

Figure 14:
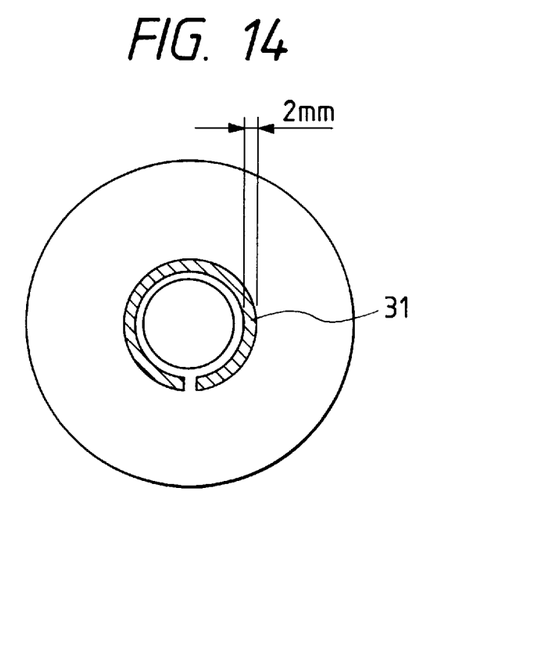
FIG. 14 is an external view of an $SiO_2$ particles coated magnetic disk concerning an embodiment of this invention.

(7) The magnetic disk is turned less than a full rotation so as to be provided with an area not coated by $SiO_2$ particles, as shown in FIG. 14. The magnetic disk and the $SiO_2$ particle dispersed solution are the same as those used in the embodiment 6. In FIG. 14, 31 indicates an area coated with $SiO_2$ particles. The non-coated area is about 0.5 mm in width. Even in this case, the same uneven area as that in (6)

can be formed by etching and removing $SiO_2$ particles. The CSS absorption characteristics are normal even when there is no uneven area.

Since the magnetic head's absorbability in the CSS area can be maintained at a proper level and another area having a different reflection factor is formed in the CSS area in such a configuration, the CSS area can be used for detecting the magnetic disk rotation speed and the magnetic disk position using an optical sensor, etc.

Figure 15:
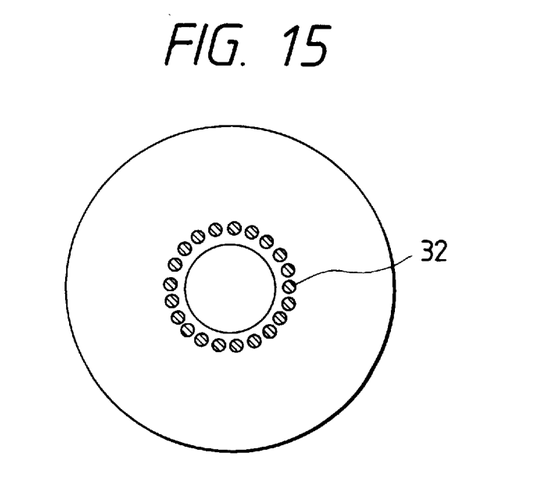
FIG. 15 is an external view of an $SiO_2$ particles coated magnetic disk concerning an embodiment of this invention.
Figure 16:
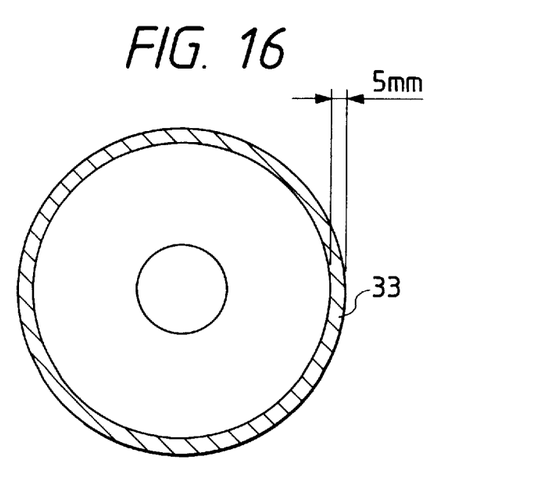
FIG. 16 an external view of an $SiO_2$ particles coated magnetic disk concerning an embodiment of this invention.

(8) The particle coating apparatus shown in FIG. 12 and used in (6) and (7) is used together with the same magnetic disk and $SiO_2$ particle dispersed solution as those in (6) and (7). The nozzles 22 first are put in contact with both sides of the magnetic disk fixed to the motor 24, and then released so as to allow the magnetic disk to turn by 20 degrees. This nozzle's contact and release cycle operation is repeated for coating the magnetic disk with $SiO_2$ particles to form coated spots as shown in FIG. 15. In FIG. 15, 32 indicates $SiO_2$ particle coated spots. After this, the $SiO_2$ particles are removed just like in the previous embodiment to form convex and concave portions at the same height.

This embodiment can have the same effect as in (7).

(9) This embodiment also uses the particle coating apparatus shown in FIG. 12 and is used in (6), together with the magnetic disk and the an $SiO_2$ particle dispersed solution generated by dispersing $SiO_2$ particles in propylene glycol monomethyl ether by 0.15 wt % used in (6) respectively. The magnetic disk fixed to the motor 24 is turned three times while the nozzles 22 are put in contact with both sides of the magnetic disk, and then the nozzles are released. The particle adhering rate becomes higher than in (6) even when the magnetic disk is turned a few times if the particle dispersion power is changed as needed. As a result, a fine uneven area can be formed by etching and removing particles.

If the magnetic disk is turned more than once in such a way, particles are dispersed uniformly, so that a higher magnetic head absorbability can be obtained in the entire area than when the disk is turned only once.

(10) This embodiment uses the particle coating apparatus shown in FIG. 3 and is used in (1) to coat masking material particles at the outer periphery of the magnetic disk. Then, etching is carried out to remove particles to form an uneven area (concave and convex portions). This embodiment also uses the same 3.5-inch magnetic disk 5 as that used in (1). The disk comprises a ground layer, a magnetic layer, and a protection layer formed sequentially on a 3.5-inch A1 alloy base. The magnetic disk is fixed to the spindle 7 of the particle coating apparatus shown in FIG. 3. The magnetic disk is then turned by the motor 6 at about 200 rpm, while the magnetic disk is dipped by about 5 mm in an $SiO_2$ particle dispersed solution, which is generated by dispersing $SiO_2$ particles in propylene glycol monomethyl ether by 0.2 wt %. The average diameter of the $SiO_2$ particles dispersed in the solution is about 300 nm. Then, the magnetic disk is taken out from the solution and turned at about 3000 rpm. As a result, $SiO_2$ particles are coated on the magnetic disk 5 within a range between the outermost periphery and the center at a width of about 5 mm indicated by 33 in FIG. 16. The particle adhering rate is about 1 to 1.2% as a result, uniform height convex and concave portions can be formed at the outer periphery of the magnetic disk by etching and removing $SiO_2$ particles.

Although the CSS area must be provided at the outer periphery of the magnetic disk in this method, the area to be coated with $SiO_2$ particles can be controlled easily at any width by changing the range of the area to be dipped in the $SiO_2$ particle dispersed solution.

Figure 17:
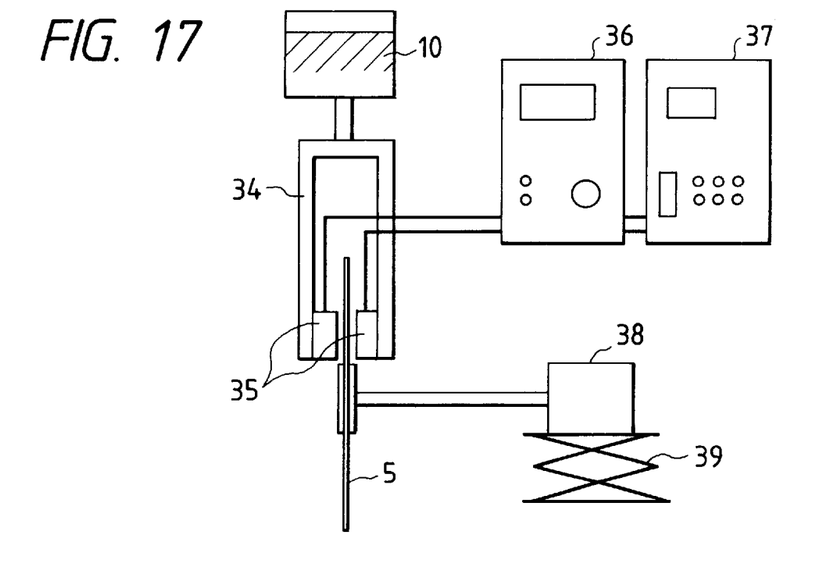
FIG. 17 is a diagram of a particles coating apparatus concerning an embodiment of this invention.
Figure 18:
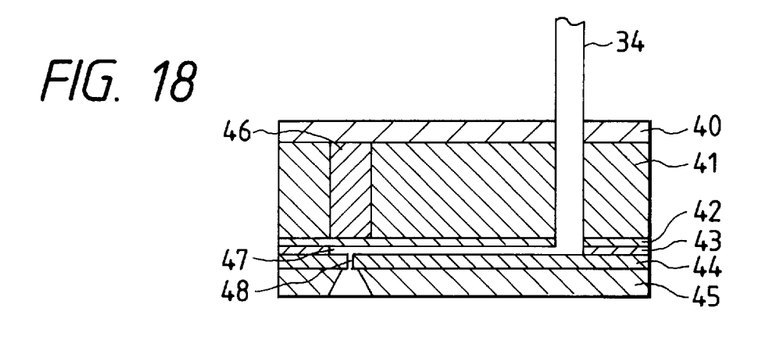
FIG. 18 is a cross section of a nozzle used in a particles coating apparatus concerning an embodiment of this invention.
Figure 19:
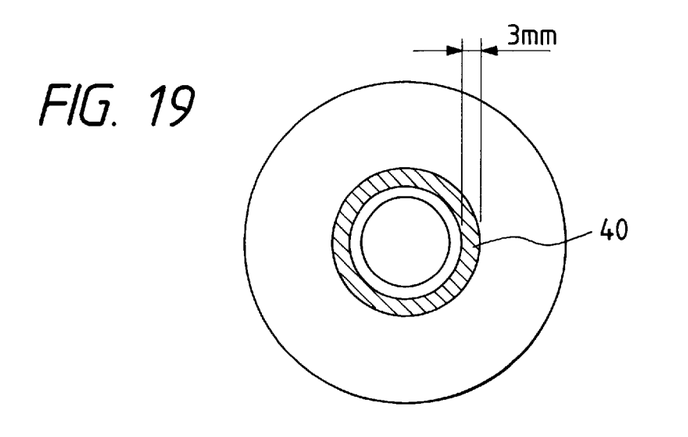
FIG. 19 is an external view of $SiO_2$ particles coated magnetic disk concerning an embodiment of this invention.

Hereunder, another embodiment of this invention will be described with reference to FIG. 17 through FIG. 19.

This embodiment uses a magnetic disk manufactured by coating masking material particles in the CSS area of the magnetic disk 5, without getting the nozzles in contact with the disk and without coating any fluorine compound on the disk, and then carrying out etching and removing the masking material.

Hereunder, the steps to manufacture the magnetic disk of this embodiment will be described.

The base of the magnetic disk is a 3.5-inch A1 alloy layer, on which a ground layer, a magnetic layer, and a protection layer were formed sequentially.

The masking material is $SiO_2$ particles whose average diameter is about 300 nm. The material is generated by dispersing $SiO_2$ particles of 0.1 wt % in propylene glycol monomethyl ether.

The masking material is coated on the magnetic disk 5 as follows. At first, a particle dispersed solution 10 was supplied to the nozzles 35 via a tube 34, as shown in FIG. 17. Each nozzle, as shown in FIG. 18, comprises a base 40 connected to the tube 34; a spacer 41; a vibration plate 42; a passage plate 43; a nozzle plate 44; a holding plate 45; and a piezoelectric element 46. The coating solution is supplied to a pressure chamber 47 through a passage provided in the passage plate 43 from the tube 34 via the base 40, the spacer 41, and the vibration plate 42, and then is discharged from the nozzles 48 according to the vibration of the vibration plate 42 driven by the piezoelectric element 46. The piezoelectric element is driven by a driver 36 and a function generator 37. The nozzles 48, each having a hole diameter of 30 μm, are arranged at pitches of 200 μm. Each nozzle is separated from the magnetic disk by about 5 mm.

The magnetic disk base is attached to the motor 38, which can move the magnetic disk base up/down according to the movement of the stage 39 going up/down. The area-to be coated with particles is adjusted to a range between radiuses 17.5 mm and 20.5 mm from the center of the magnetic disk.

The solution is discharged on the magnetic disk by driving the piezoelectric element for about 0.5 sec while turning the magnetic disk at about 500 rpm. Particles are coated in the portion indicated by 40 in FIG. 19. How $SiO_2$ particles are stuck on the magnetic disk is checked using an SEM (Hitachi S-4000). An actual check by the SEM proved that particles were coated properly as single particles almost like the status shown in FIG. 6. The proportion of the area occupied by $SiO_2$ particles was about 0.7 to 1.0%.

The subsequent processes for etching and removing the masking material were the same as those in (1) to (5). As a result, uniform fine convex and concave portions were formed between radiuses 17.5 mm and 20.5 mm from the center of the magnetic disk, where particles shown in FIG. 19 were stuck at a width of about 3 mm on the carbon protection film of the magnetic disk 5.

In this embodiment, 15 nozzles, each of which has a 30 μm diameter hole, are arranged at pitches of 200 μm and each nozzle surface is separated from the magnetic disk by about 5 mm. The number of holes and pitches may be changed, however, if ultraparticles can be coated uniformly on the magnetic disk. The gap between each nozzle and the magnetic disk may be under 5 mm, although it depends on the solution discharging conditions. If the gap is over 5 mm, however, the solution linearity is apt to be lost and this possibly makes it difficult to form a uniform coating width.

The shapes of the nozzles are not limited specially; straight, tapered, or any other type of nozzle provided with an orifice at its tip may be adopted.

According to this embodiment, since no fluorine compound is coated on the magnetic disk, the compound coating process can be omitted and the magnetic disk can be prevented from being damaged while the disk is put in contact with the nozzles. In this case, however, the coating width is determined by how the nozzles are arranged. Compared with a case in which a fluorine compound is coated on the magnetic disk, therefore, controlling of the coating range becomes a little difficult. This problem can be solved by changing the number of nozzles and their positions in the arrangement, however.

This invention, therefore, can provide a magnetic recording medium which is excellent in reliability and durability, and which enables high density recording, and a magnetic recording apparatus using the above recording medium.

Furthermore, this invention can provide a method for manufacturing the above magnetic recording medium which is excellent in reliability and durability, and which enables high density recording, and an apparatus for manufacturing the magnetic recording medium.

What is claimed is:

1. A magnetic disk apparatus comprising:

a magnetic disk; and a magnetic head moveable over said magnetic disk for recording data on and reproducing data from said magnetic disk, said magnetic disk comprising a data area for recording information and a CSS area which is contacted by said magnetic head, said CSS area being provided with concave and convex portions existing together with smooth portions, and said concave and convex portions having an average surface roughness Ra which is within a range of 1 to 20 nm, an average diameter Dm of the convex portions being within a range of 10 to 1000 nm, wherein said concave and convex portions are portions formed by providing dispersed particles, overlying a protective film which overlies a magnetic film, where the concave and convex portions are to be formed, and etching the protective film, using the dispersed particles as a mask, to form the concave and convex portions.

2. A magnetic disk apparatus as defined in claim 1, wherein the total area of said convex portions is 1 to 5% of the total area of said concave and convex portions.

3. A magnetic disk apparatus as defined in claim 1, wherein said concave and convex portions are provided only in said CSS area.

4. A magnetic disk apparatus as defined in claim 1, wherein said magnetic disk includes a substrate, the magnetic layer formed thereover and the protective film formed over the magnetic layer, and wherein the concave and convex portions are provided only in the protective film.

5. A magnetic disk comprising:

a data area for recording information; and a CSS area for which is contacted by a magnetic head, said CSS area being provided with concave and convex portions existing together with smooth portions, and said concave and convex portions having an average surface roughness Ra which is within a range of 1 to 20 nm, an average diameter of the convex portions Dm being within a range of 10 to 1000 nm, wherein said concave and convex portions are portions formed by providing dispersed particles, overlying a protective film which overlies a magnetic film, where the concave and convex portions are to be formed, and etching the protective film, using the dispersed particles as a mask, to form the concave and convex portions.

6. A magnetic disk apparatus as defined in claim 5, wherein the total area of said convex portions is 1 to 5% of the total area of said concave and convex portions.

7. A magnetic disk as defined in claim 6, wherein said concave and convex portions are provided only in said CSS area.

8. A magnetic disk as defined in claim 5, wherein said magnetic disk includes a substrate, the magnetic layer formed thereover and the protective film formed over the magnetic layer, and wherein the concave and convex portions are provided only in the protective film.

* * * * *